UNITED STATES PATENT OFFICE.

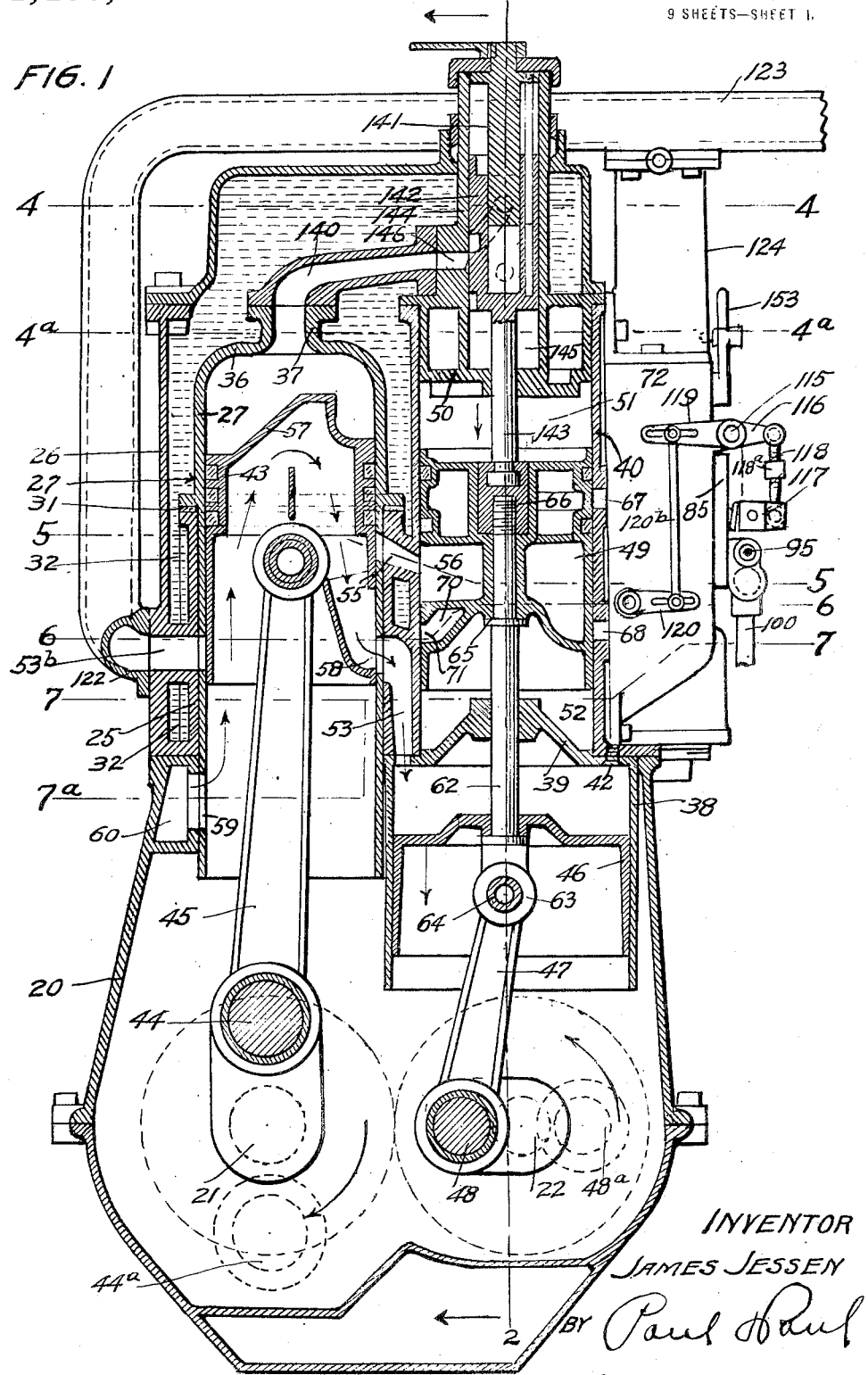

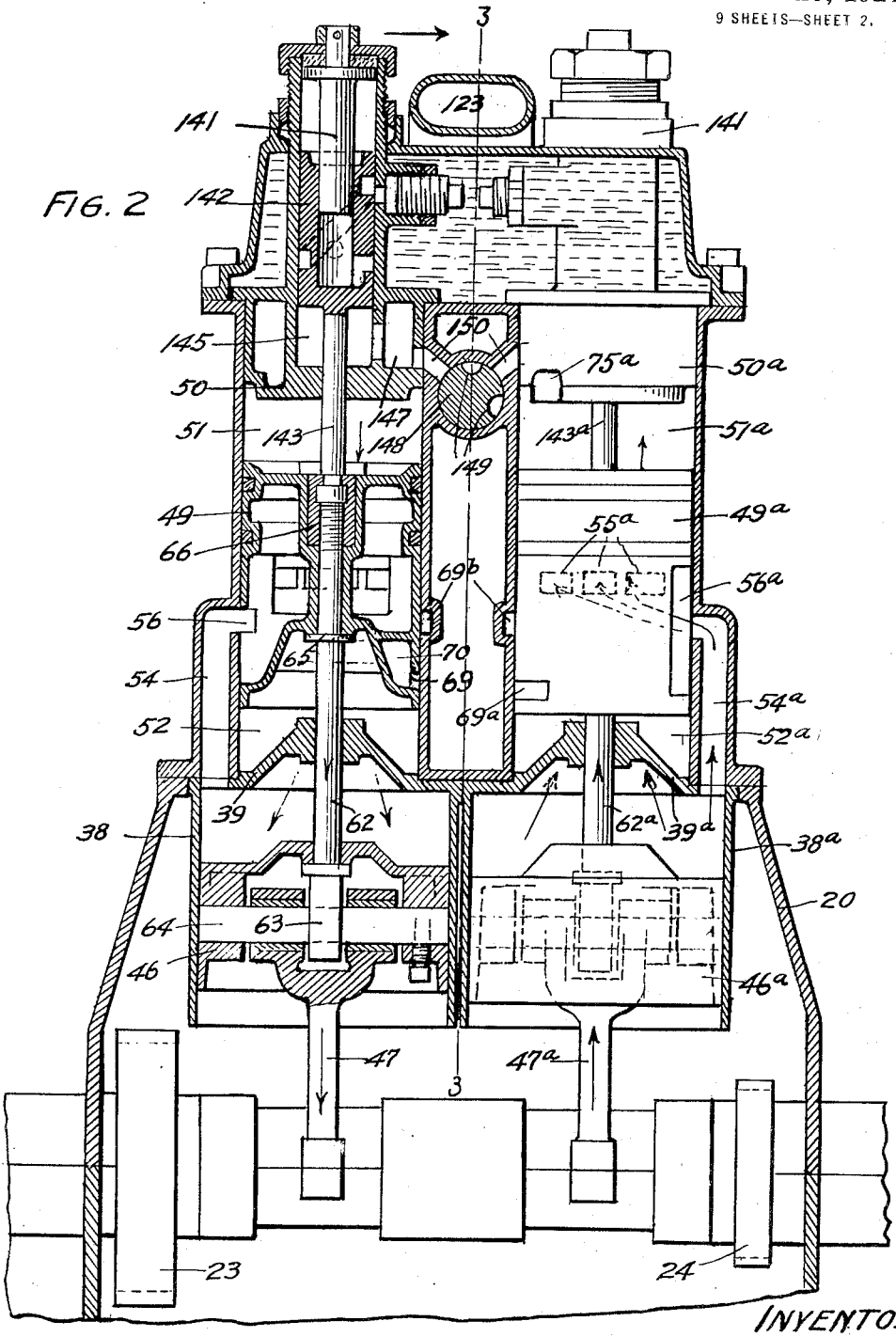

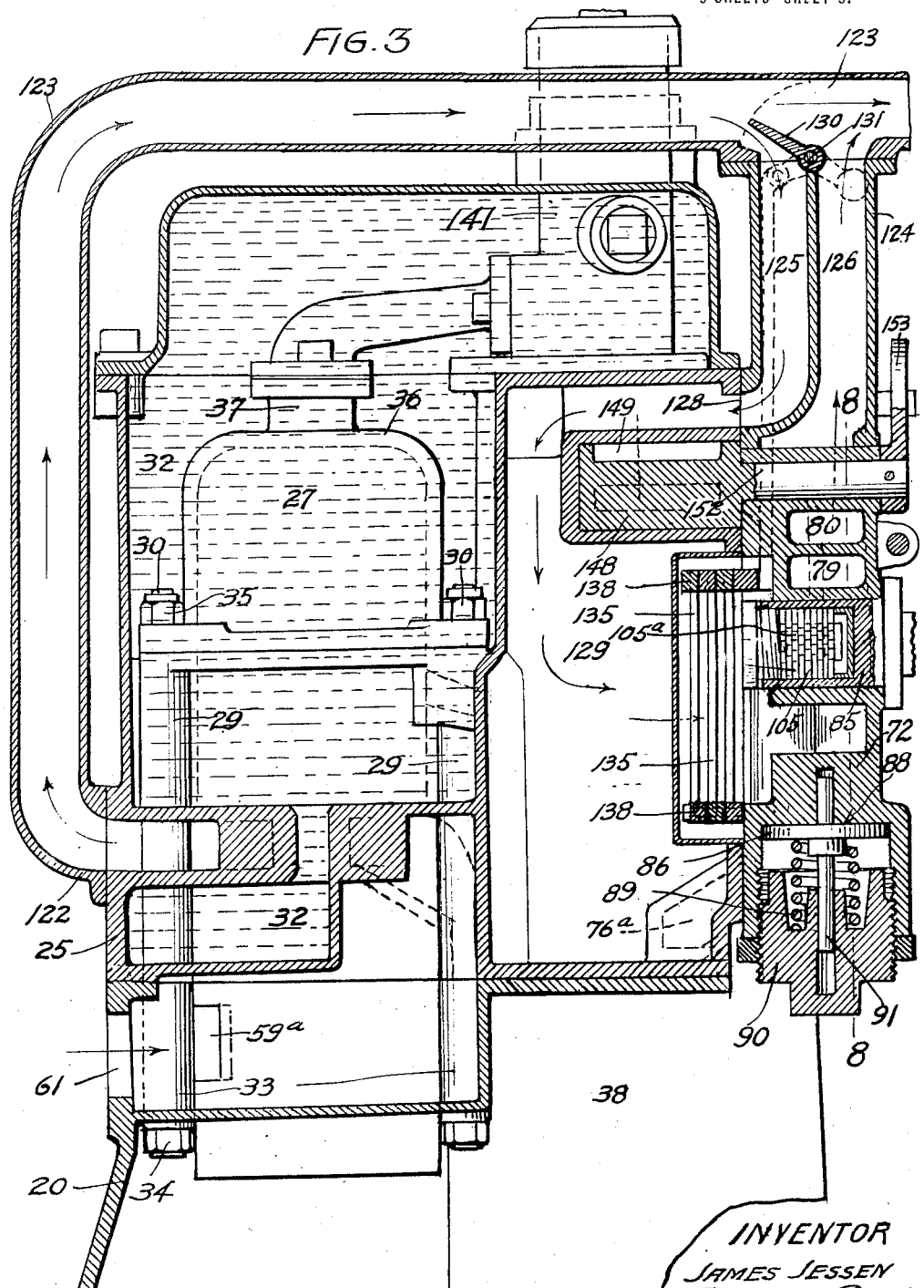

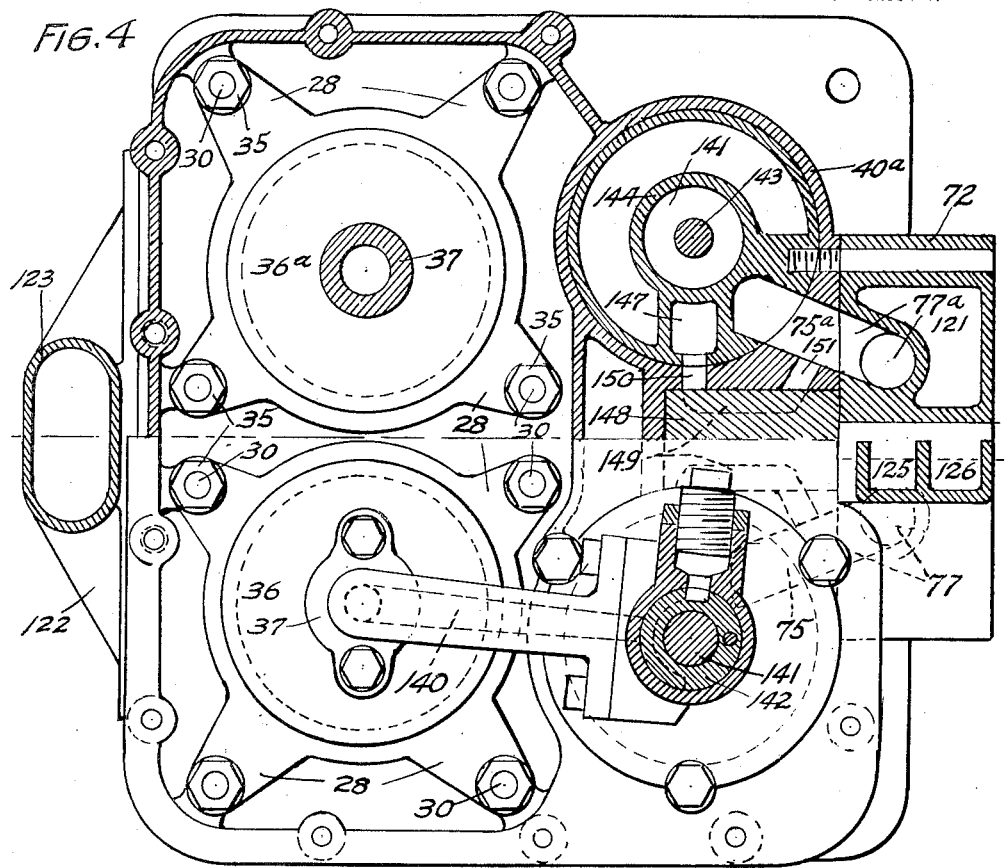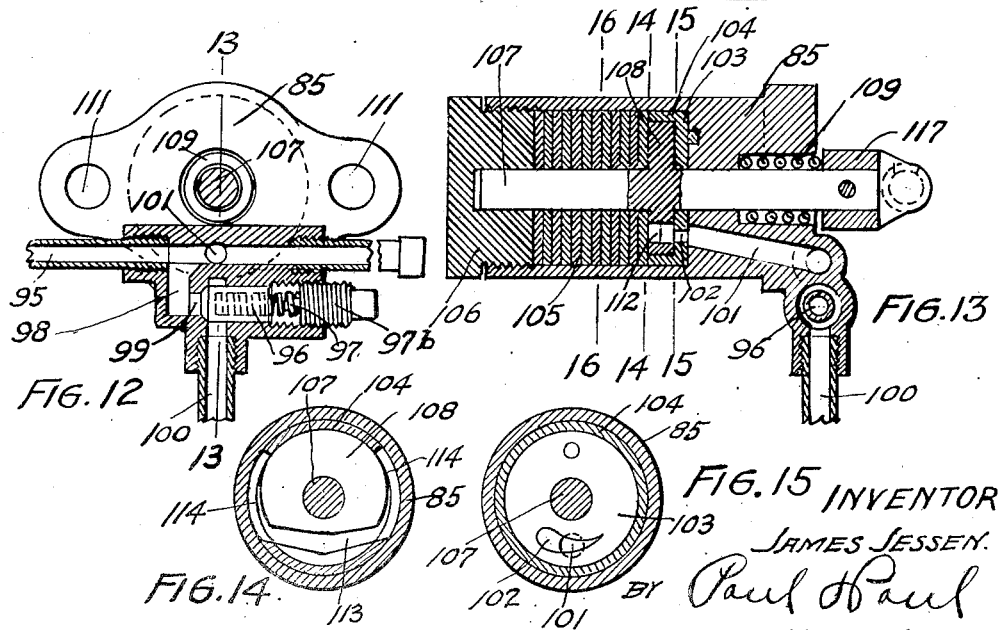

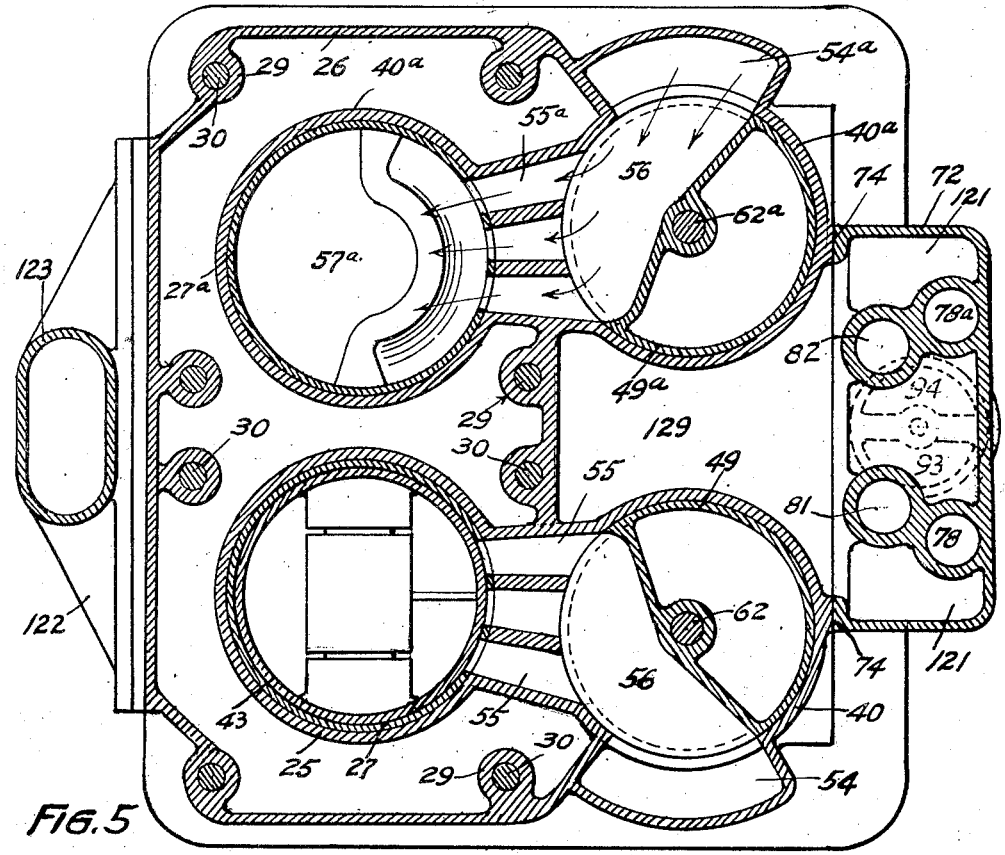
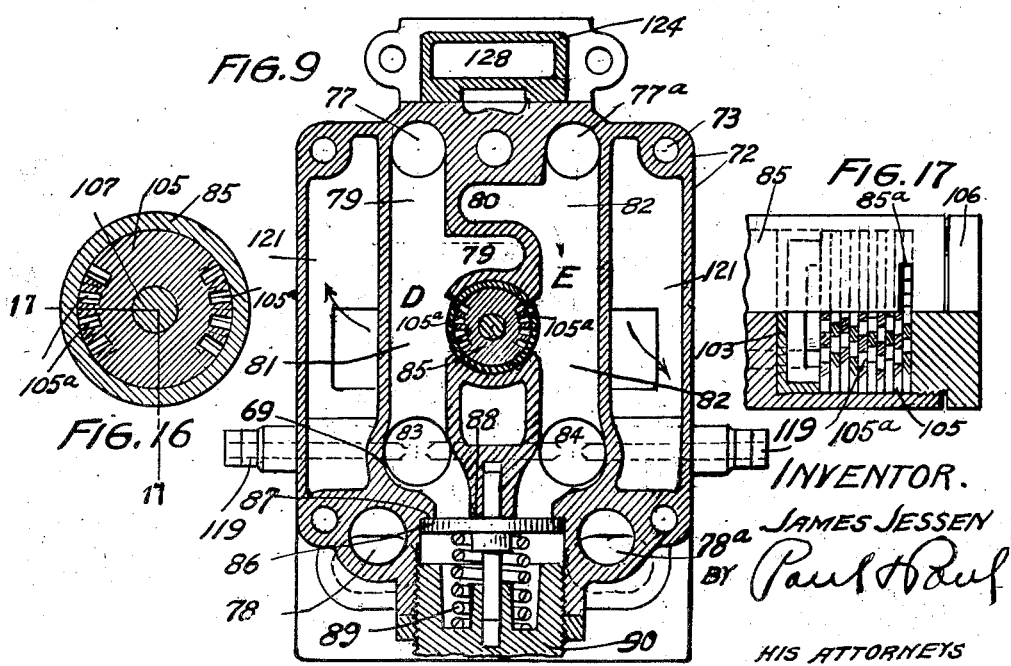

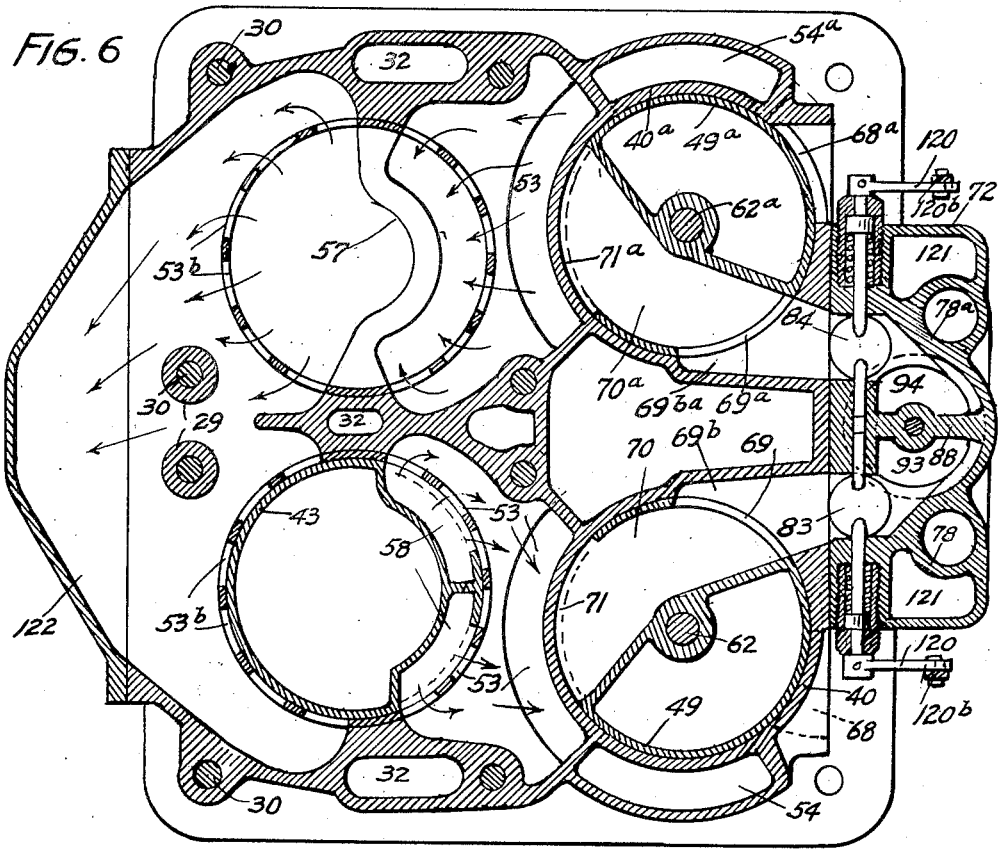
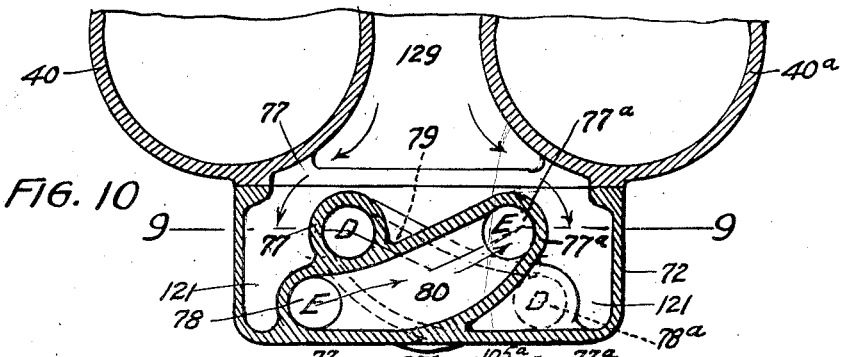
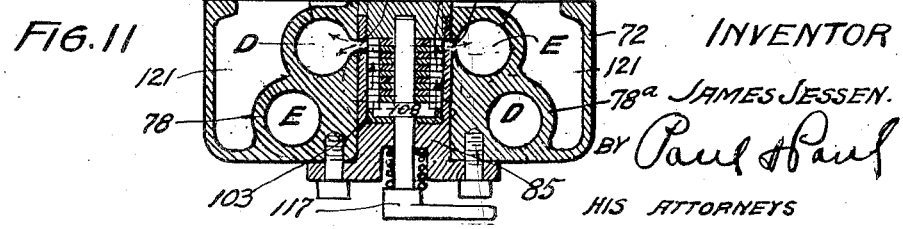

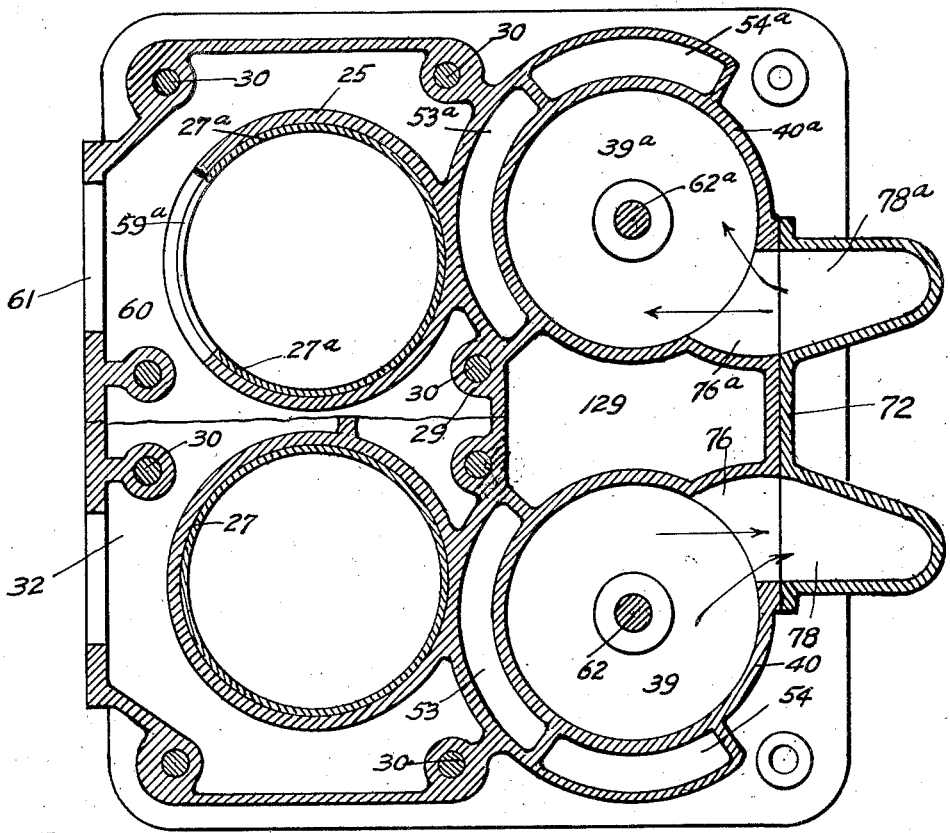
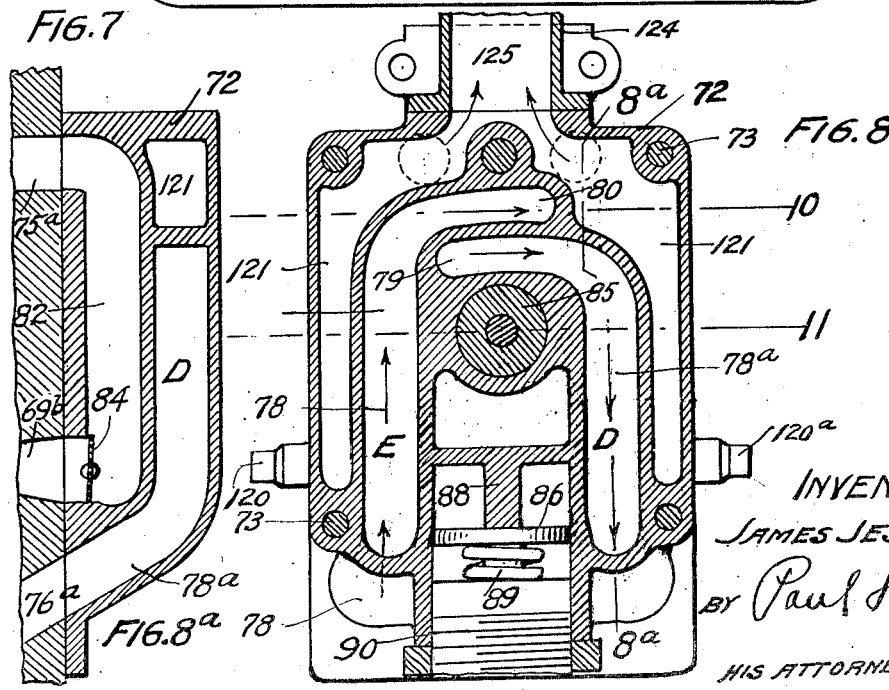

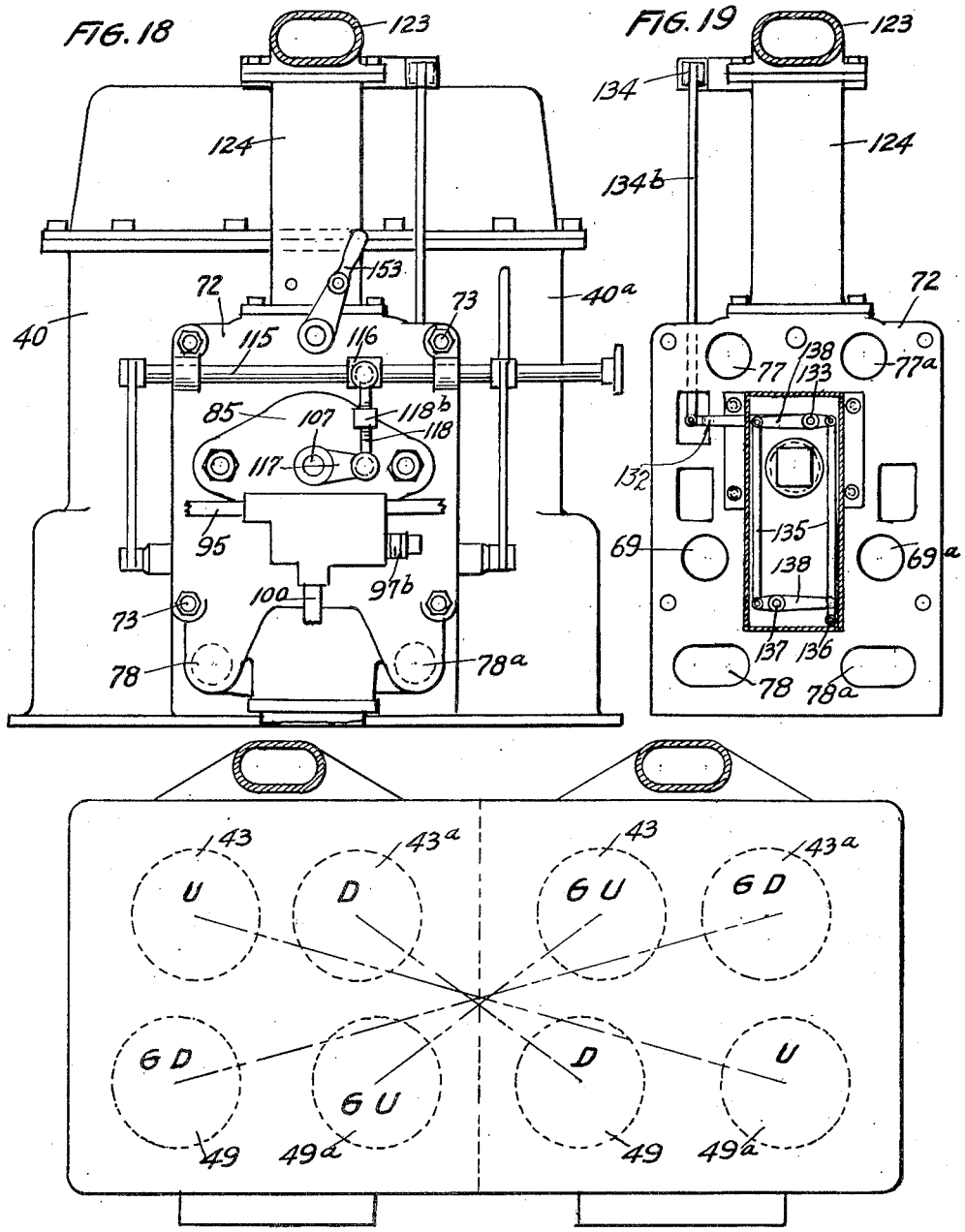

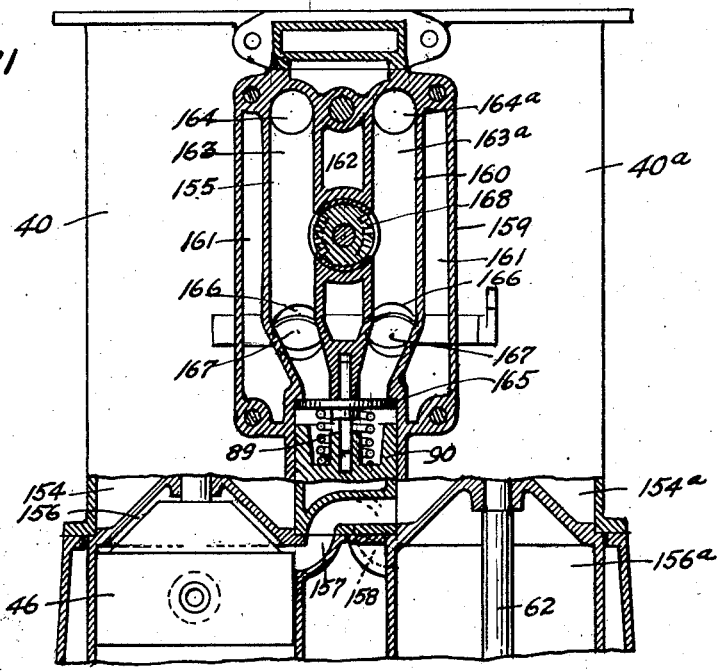
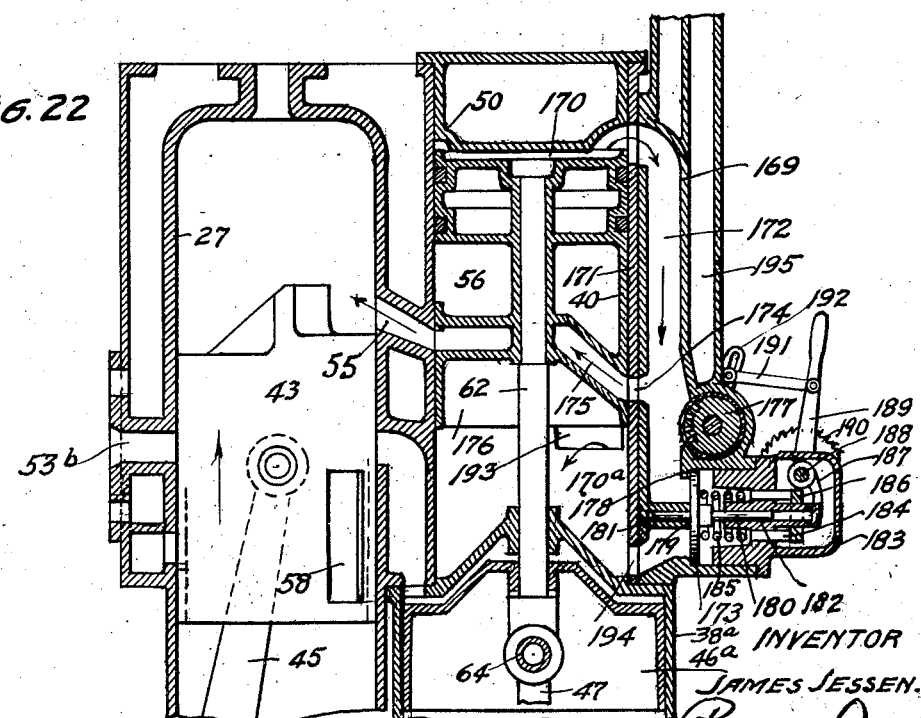

JAMES JESSEN, OF MINNEAPOLIS, MINNESOTA.

INTERNAL-COMBUSTION ENGINE.

1,400,955.      Specification of Letters Patent.      Patented Dec. 20, 1921.

Application filed August 16, 1919. Serial No. 318,005.

*To all whom it may concern:*

Be it known that I, JAMES JESSEN, a citizen of the United States, residing at Minneapolis, county of Hennepin, State of Minnesota, have invented certain new and useful improvements in Internal-Combustion Engines, of which the following is a specification.

My invention relates in general to improvements in gas converting and inducting mechanism in the engine shown and described in my applications filed Mar. 21st, 1916, Serial Numbers 85,572 and 85,573, one allowed May 21st, 1919, and the other July 21st, 1919.

The objects of my invention are:

First, to provide improved means for the preliminary atomizing or breaking up of the heavier grades of fuel oil and the feeding of the resultant vapor into a strong blast of air, to precipitate the heavier constituents of the fuel repeatedly until broken up and to thoroughly oxygenate the combustible mixture and convert it into a homogeneous dry gas before it can be inducted into the combustible cylinder.

Second, to slowly apply heat to the fuel vapor in its repeated passage through heating conduits and to maintain an even temperature in the conduits under all conditions of speed and load in all altitudes.

Third, to design an engine that, without any additional devices or attachments will automatically compensate for the difference in air pressure at different altitudes and maintain equal power output and efficiency in all practical altitudes.

Fourth, to reduce the weight of the engine relative to power output; and

Fifth, to make all the parts easily accessible and cheap of manufacture.

Other objects will appear from the following detailed description and the invention consists generally in the various constructions and combinations, all as hereinafter described and particularly pointed out in the claims.

The invention relates to an internal combustion engine in which four piston strokes carry out the cycle of operations, the strokes being performed by two piston units during one revolution of the crank shaft and the crank-arcs for the piston units operating at right angles to each other. The engine comprises a power or combustion cylinder unit with an air and gas induction cylinder unit, each unit performing the major or active portion of its piston strokes during the nearly inactive piston movements around the dead crank center of the other. This novel arrangement enables the piston units to coöperate in valve action for each other to completely and positively control the operations of the cycle without any additional valves. The air and gas induction unit comprises an air blowing piston and a gas compressing and blowing piston working in separated tandem cylinders and the engine, by the action of the gas blowing piston and a special gas generating conduit carries out a positive and effective gas producing process as a part of the active cycle.

Briefly the working cycle in a multi-cylinder engine which will be here only considered, operates as follows: Assuming two power cylinders, the induction cylinder unit being then in tandem pairs are working 180 degrees apart on the crank circle and gas passes freely at high velocity through the generating conduit from one gas cylinder to the other. The conduit is exhaust heated and in the bottom of it is arranged an automatic pressure regulating valve. Fuel oil is sprayed under low pressure, by a small gear pump, into the rapidly rushing air or gas in the conduit. The extreme velocity of the gas combined with the heat in the passage breaks up and expands or separates the air and gas molecules and fuses them into a uniform dry, but rich fuel gas. Near the end of the compression strokes of the gas piston a pressure is created in the conduit, due to the action of the pressure valve, through which the gas stream must pass for each piston stroke, and the piston opens up a gas passage through itself from the conduit to the combustion cylinder, the piston of which has just then closed the exhaust ports after the cylinder has been filled with air, as will hereinafter appear. A throttle regulated amount of gas under light pressure then passed into the combustion cylinder during the compression stroke of the power piston until this piston closes the gas admission port arranged slightly above the middle of the combustion cylinder. The pressure regulating valve is located in a curve in the conduit below the gas passage to the combustion cylinder and the heavier or less perfectly gasified fuel vapor is precipitated past the passage port downward through the pressure valve and prevented from entering the combustion cylinder until, by repeated passages, it is perfectly converted into a dry gas. Simultaneously with the gas induction by one gas piston, air from atmosphere enters the opposite gas cylinder through ports to atmosphere uncovered by this piston, which is then near the end of the suction stroke. At the same time the gas admission ports are at the point of being closed by the power piston and compression proceeds until the charge is ignited by a separate ignition device. The perfect state of the gas inducted into heated air in the combustion cylinder during the compression stroke and the short time before ignition prevents any reaction or condensation of the combustible charge and insures complete combustion. During the final compression and initial expansion stroke of the power piston, ports to atmosphere are uncovered by this piston and the air induction piston, being then on its major suction stroke, draws air through the power piston under its top into the air induction cylinder and cooling the top of the power piston. (See figure 1.) At this time also, the opposite gas piston of the pair coöperating in like manner with the other combustion cylinder, is on the compression stroke and while the air is flowing into the air induction cylinder as just described, gas is blown from the opposite gas cylinder through the conduit and pressure valve and into the gas cylinder from which gas has been transferred to the combustion cylinder. During the following major stroke of the air and gas pistons of this unit, the exhaust ports are uncovered by the power piston and air is blown freely from the air induction cylinder into the power cylinder, until the exhaust ports are closed, driving out the exhaust gases and replacing them with pure air. During this stroke gas is again compressed in the gas cylinder and immediately the exhaust ports are closed by the power piston, gas is again admitted by the gas piston from the gas conduit to the combustion cylinder through the middle cylinder ports through ports 55. During the major portion of the expansion stroke of the power piston these ports are closed by the gas piston, which is then at the inactive portion of its suction stroke and nearly stationary, and are uncovered by the power piston only after the pressure has been reduced in the combustion cylinder, being sealed by a piston ring at each side. While the cycle as described has been carried out in one pair of cylinders, the opposite pair has coöperated in like manner in the cycle 180 degrees apart on the crank circle the gas pistons of both pairs co-acting in the gas generating process.

As the combustion cylinder is practically filled with pure air for each charge, it follows that only a portion of the rich gas circulated in the gas conduit is needed to form the combustible charge, provided the gas piston displacement is of sufficient volume, and the remainder therefore, continues in rapid circulation in the conduit. Also, as the volume of air and gas that may be inducted into the combustion cylinder is dependent only on the volume displacement of the air and gas pistons, it follows that if this displacement is of greater volume, at low altitudes than needed, the surplus gas will continue to circulate and alternate from the compression to the suction of the gas cylinders and chambers, passing through the regulating valve at each piston stroke. The surplus will automatically be drawn upon as higher altitudes and more rarified air is encountered, the pressure controlling valve automatically maintaining a predetermined pressure in the conduit for supplying gas to the combustion cylinder and admitting the surplus gas to the suction chambers. A uniform weight of gas will, therefore, be inducted into the combustion cylinder independent of the atmospheric pressure. As will hereinafter be described more in detail, the gas pistons being double acting, one end of the pistons, are for land or marine service, used for blowing pure air into the opposite combustion cylinder in coöperation with corresponding air induction cylinder. For air service, however, I prefer to enlarge the volume displacement of the air induction cylinder and cross-connect the double acting gas piston chambers through suitable conduits, and thereby obtain a double piston displacement and volume of gas, which will hereinafter be fully described.

In the accompanying drawings, forming part of this specification,

Fig. 1 is a vertical transverse section of an engine having my invention applied thereto;

Fig. 2 is a vertical section on the line 2—2 of Fig. 1;

Fig. 3 is an enlarged vertical section on the line 3—3 of Fig. 2;

Fig. 4 is a horizontal section on the line 4—4 and 4ª—4ª of Fig. 1;

Fig. 5 is a horizontal section on the line 5—5 of Fig. 1;

Fig. 6 is a horizontal section on the line 6—6 of Fig. 1;

Fig. 7 is horizontal sections on the lines 7—7 and 7ª—7 of Fig. 1;

Fig. 8 is a vertical section on the line 8—8 of Fig. 3;

Fig. 8a is a sectional view on the line 8a—8a of Fig. 8;

Fig. 9 is a vertical section taken on the horizontal plane line 9—9 of Fig. 10;

Fig. 10 is a horizontal section on the line 10—10 of Fig. 8;

Fig. 11 is a similar section on the line 11—11 of Fig. 8;

Fig. 12 is a section of the atomizing plug taken on the line 12—12 of Fig. 13;

Fig. 13 is a sectional view of the plug on the line 13—13 of Fig. 12.

Fig. 14 is a section on the line 14—14 of Fig. 13;

Fig. 15 is a section on the line 15—15 of Fig. 13;

Fig. 16 is a section on the line 16—16 of Fig. 13;

Fig. 17 is a section on the line 17—17 of Fig. 16;

Fig. 18 is a rear elevation of the pump cylinders;

Fig. 19 is a rear elevation of the gas generating coil casing having a thermostat applied thereto;

Fig. 20 is a diagrammatical view illustrating the inertia balance of the pistons on a double unit engine;

Fig. 21 shows a modified form of the gas generating conduit casing, it being applied to an engine for ordinary land service as for tractors, trucks or automobiles, where the range of altitude compensation required is less.

Fig. 22 illustrates the generating conduit modified and attached to a single power cylinder engine.

Referring to Figs. 1 and 2 of the drawing, 20 represents the crank case, which may be of any preferred construction for mounting in suitable bearings, the main crank shaft 21 and auxiliary or pump crank shaft 22. Helical gears 23, indicated in dotted lines in Fig. 1, are mounted on the crank shafts 21 and 22 and mesh to operate the shafts at equal speed, and gears 21a are mounted on the pump shaft 22 for the purpose of driving the fuel or oil pumps not shown in the drawings. A single unit of the engine comprises two combustion cylinders and two pump cylinders and I prefer to cast the lower port, casing 25, the jacket 26 and the two pump cylinders in one block and of aluminum or other light alloy metal. As the two pump cylinders with their pistons and connecting rods are identical in construction and the two combustion cylinders are alike, I shall hereafter describe only one set of cylinders in detail and differentiate by adding the reference letter "a" to the other cylinders.

The combustion cylinder 27 is of cast iron or steel in the form of a sleeve, having lugs or arms 28 (Figs. 3 and 4) adapted to be secured to long bosses 29 of the port casing 25 by means of bolts 30. Suitable packing 31 may be provided to seal the port openings from the water space 32. The bolts 30 pass through the lower bosses 33 in the crank case below which they are provided with nuts or heads 34 and the cylinder sleeves and entire cylinder block are rigidly clamped to the crank case by means of the clamping nuts 35. The cylinder 27 is preferably provided with an integral head 36 and neck 37 to which the ignition device may be secured. The air pump cylinder 38 having a cone shaped head 39 is preferably formed independent of the pump cylinder 40 and is secured to the under face or flange 41 of the pump cylinder by means of screws 42. The power piston 43 operating in the combustion cylinder 27 is connected to the crank 44 of the shaft 21 by a rod 45 and the pump piston 46 has a connecting rod 47 to the crank 48 of the shaft 22. The cranks 44 and 48 are at substantially right angles as shown in Fig. 1, the pump crank 48 being in advance of the main crank 44 at about 90 degrees and turning in the opposite direction. The main or combustible cylinder cranks 44 and 44a are spaced 180 degrees apart as indicated in dotted lines in Fig. 1 and the pump cranks 48 and 48a are spaced 180 degrees apart. The power pistons operate on the two stroke cycle and by the crank arrangements above described, the power pistons are positioned to act as valves for the pump pistons and the pump pistons as valves for the power pistons.

The double acting pump piston 49, which on account of this double action is termed "valve piston," operates between the lower cylinder head 39 and an upper head 50, forming an upper pumping chamber 51 and a lower pumping chamber 52. Both the upper and lower chambers are utilized in the present invention for generating and supplying combustible gas to the combustion cylinder in order to furnish capacity to the engine to adjust itself to the greatest range of altitudes for aeronautical service. But the lower chamber may be used for supplying air to the combustion cylinders in combination with one of the lower air pumps. For this purpose, the air pump cylinders are enlarged so each can independently supply the air necessary for the replacement of the burnt gases in the combustion cylinders and the four pumping chambers 51, 52, 51a and 52a coöperate with the other parts as presently will be described to automatically supply the combustion cylinder with combustible charges of equal air density in all altitudes. Scavenger or replacing air is forced from the air pump 38 to the combustion cylinder through ports 53, passage 54 and ports 55 when the power piston is at the lower end of its stroke, the burnt gases passing out through the exhaust ports 53b. The air passing through the passage 54 and through the valve piston port 56 and ports 55 (see Figs. 1—2 and 5), starts somewhat later than the air passing through the ports 53 and continue to pass a little later after these ports are closed. On the following suction stroke of the air pump piston, air passing under the power piston head 57 is drawn through the ports 58 in this piston from an inlet port 59 in the cylinder wall, through a chamber 60 and opening 61 in the crank case to the atmosphere as indicated by arrows in Fig. 1. This feature is substantially as in my former application and forms no part of the present invention. A piston rod 62 is attached by means of an eye 63 to the piston pin 64 of pump piston 46 and, extending upward through the head, is rigidly secured to the valve piston 49 by means of a shoulder 65 and threaded nut 66.

Referring to Figs. 1 and 6, air admission ports 67 and 68 from atmosphere are provided in the pump cylinder wall and are uncovered successively at each end of the strokes of the double acting valve piston to admit air. In each chamber 51 and 52 following the admission of air, compression occurs after the air ports are closed on the succeeding stroke of the piston. As the cranks operating the pistons 49 and 49$^a$ are 180 degrees apart, the pistons work in opposite directions and the lower chamber of one cylinder and the upper chamber of the other have admission, compression and exit occurring simultaneously.

An inlet port 69 in the valve piston 49 (Figs. 2 and 6) is adapted to register with a port 69$^b$ in the pump casing and communicate by a passage 70 through the piston and a piston port 71 with the admission ports 55 to the combustion cylinder, when the piston is at the upper end of its stroke and immediately after the air port 56 has passed the ports 55. Both air from the air pump cylinder 38 and gas from gas chamber 51 pass through the ports 55 into the combustion cylinder, the air preceding the gas. Referring to Figs. 3 to 10, the upper pump chamber 51 is cross connected to the lower pump chamber 52$^a$ of the pump cylinder 40$^a$ and the upper pump chamber 51$^a$, to the lower pump chamber 52 of the pump cylinder 40, through coils in a gas producing conduit casing 72. This casing is fastened to the cylinder block by suitable screws 73 and has gas tight joints 74 with the block. A port 75 leads out from the upper pump chamber 51 and a port 76 from the lower chamber 52 to conduits 77 and 78 respectively in the casing 72. A cross conduit 79 connects the upper conduits 77 to the lower 78$^a$, and a similar conduit 80 connects the upper port 77$^a$ to the lower port 78. The conduits 77 and 79 have a branch 81 leading to the inlet ports 69 and the conduits 80 and 77$^a$ have a branch leading to the inlet port 69$^n$. Throttle valves 83 and 84 are arranged in the conduit outlets by which admission of gas to the combustion cylinders is controlled.

The conduits 77, 79, 81 and 78$^a$ forming connections between the pump chambers 51 and 52$^a$ will hereafter be designated by the letter D and the conduits 77$^a$, 80, 82 and 78, connecting the pump chambers 51$^a$ and 52, by the letter E. It is evident that when there is compression in D there will be suction in E and that compression and suction will alternate in the conduits D and E with each stroke of the valve pistons.

The areas of the conduits are constricted in order to induce high velocity and frictional heat for breaking up of the fuel, its diffusion with air and the production of a dry superheated gas. The fuel is sprayed continuously into a high velocity stream of air or gas from an atomizing plug 85 the details of which will hereinafter be more fully described.

It will be understood that substantially all of the compressed gases in chamber D may be admitted to the combustion cylinder 27 through cylinder ports 69 and 55 and valve piston ports 70 and 71 and that in a like manner the product in E may be admitted to the combustion cylinder 27$^a$ through the respective similar ports. The portion of the gases admitted depends on the degree of compression in the conduits and the throttle opening. This compression is controlled by a pressure governing or compensating valve 86 located between conduits D and E which open when a certain predetermined pressure is exerted on the valve in either conduit and lets the excess product pass to the other conduit. The valve 86 is located below the intake ports 69$^a$ and is provided with a circumferential seat 87 and cross seat 88. It is held to its seat by a compression spring 89 that is adjustable to tension by the threaded nut 90. The valve stem 91 is adapted to slide in bearings in the nut 90 and valve seat 88. This seat crosses the valve opening and divides the valve opening into two semi-circular openings 93 and 94 (Fig. 6), the former opening cut to the conduit D. When the pressure in either conduit exceeds the predetermined point adjusted by the tension of the spring 89 and generally about 20 pounds to the square inch, the valve is depressed and gas passed under the cross seat from one conduit to another.

Referring to Figs. 11 to 17, the fuel oil for the generation of gas is pumped from a suitable reservoir (not shown) by a fuel pump (not shown) but preferably of the gear type and it delivers the fuel under pressure through a pipe 95 to the atomizing and feeding plug 85. The pressure is regulated by a by-pass valve 96 seated by the tension of a spring 97 and adjusted by means of threaded plug 97<sup>b</sup> to open at a pressure somewhat above the pressure in the conduits D and E. The fuel is by-passed through the chamber 98, valve port 99 and pipe 100 back to the reservoir and a uniform pressure is maintained in the chamber 98. A fuel duct 101 leads from the pressure chamber 98 to a tapered slot 102 in a plate 103 having a rim 104 arranged in a recess in the plug 85. A series of disks 105, having peripheral slots 105<sup>a</sup> are arranged in the recess and the inner disk bears against the rim 104 of the plate 103. By means of a nut 106 screwed into the recess of the plug 85 the disks 105 and plate 103 are clamped against the bottom of the recess and held firmly in the desired position. A stem or spindle 107, having bearings in the plug 85 and nut 106, is provided with a disk 108 adapted to turn between the plate 103 and inner disk 105. A compressed coil spring 109 recessed in the plug 85, bears against the hub of an arm 110 and tends to hold the face of the disk 108 against the plate 103. The plug 85 is fitted in the casing 72 between the conduits D and E and has holes 111 by means of which it is fastened to the conduit casing. The fuel is forced in a continuous stream through the valve opening 102, regulated by the position of a feeding hole 112 in the valve with relation to the tapered slot 102, and as it passes through the ducts 113 and 114 it enters the pulverizing slots 105<sup>a</sup> and emerges from the nozzles 85<sup>a</sup>. The walls of the slots form abutments against which the fuel impinges and the space between these abutments through which the fuel must pass is adjustable and may be adapted to the nature of the fuel by adjusting the relative position of the slots to each other. By loosening the nut 106 the disk may be turned to adjust the slots to any desired opening after which the disks are secured in place by tightening the nut. In order to maintain a constant quality fuel mixture in the gas converting conduits a spindle 115 is mounted in bearings, preferably on the casing 72 (Figs. 3 and 18) and an arm 116 fastened on the spindle. The arm 117 is fastened to the spindle 107 and has universal connection through a threaded rod 118, having an adjusting thumb nut 118<sup>b</sup> with the arm 116. See Figs. 1 and 9. Arms 119 fastened on the spindle 115 and have link connections 120<sup>b</sup> to the throttle arms 120. The arms 119 and 120 are preferably slotted for adjustment to the desired proportionate movement of the throttle valves and fuel valve. When the throttle valves are closing the fuel feed hole 112 is moving toward the narrow end of the tapered slot 102, permitting less fuel to pass through to the atomizing chambers and conduits conversely when the throttle valves are opened, the feed hole 112 is moved toward the large end of the slot. The angle of the slot is proportioned to the degree throttle opening from zero to full opening.

Although the fuel pump pressure is greater than the pressure in the conduits D and E in passing through the atomizing chamber, the pressure is reduced to practically the pressure in the conduits and a small amount of air is mixed with the fuel passing from the compression to the suction side. The fuel vapor will therefore be diverted to the conduit being in temporary suction and will emerge alternately from the nozzles 85<sup>b</sup> to the conduits D and E. See Fig. 11. It will therefore not enter the admission ports to the combustion cylinder until it has passed through all the converting conduits and generally it will pass through the conduits and by-pass valve 86 many times before being inducted into the combustion cylinder, the number of passes increasing with the closing of the throttle. The repeated rushing through the restricted conduits at high velocities generates heat and effects an oxygenation of the fuel before it can enter the combustion cylinders. In addition to the heat thus generated, especially for the heavier fuel oils, I prefer to apply external heat to the conduits from the exhaust gases and to regulate this heat in proportion to the speed and load on the engine. To this end, the converting conduits are provided with a jacket, partly or wholly surrounding the conduits and forming heating chambers 121 through which the exhaust gases may be circulated in a controlled volume. See Fig. 9. An exhaust manifold 122 having an exhaust pipe 123 covers the exhaust ports 53<sup>b</sup> and the pipe passes upward and over the engine. See Fig. 3. Above the conduit casing 72 a branch manifold 124 having passages 125 and 126 connects the pipe with the conduit casing 72 and with an opening 128 between the pump cylinders having access to the chamber 129 between the cylinders. This chamber is tightly covered by the conduit casing and has communication to the lower portion of the heating chambers 121 surrounding the conduits. The upper ends of the chambers 121 have connection with the return passage 126 of the manifold 124 to the exhaust pipe 123. A damper or valve 130 is arranged on a spindle 131 to cover the inlet to the passage 125 or to close or partially close the exhaust pipe 123 and thus divert all or any portion of the exhaust gases to the conduit heating chambers 121.

With the arrangement of heating conduits, pressure governing valve and pump chambers and pistons as heretofore described a practically constant heat is maintained in the gas converting conduits, with a fixed opening of the exhaust damper 130. At full load with full throttle opening a higher temperature is developed in the combustion cylinder and the products of combustion are exhausted from the cylinders at considerably higher temperature and more heat is passed to the converting conduits. At the same time the fuel gases are passed through the converting conduits in a proportionately shorter time and are heated to about the same degree as when, with a small throttle opening and less exhaust heat, the gases are passed through the conduits repeatedly many times before entering the combustion cylinder, absorbing exhaust heat and creating heat in the conduits by friction.

For aviation service however, I prefer to connect the heat damper to a thermostat 135 as shown in Figs. 3 and 19 by means of a lever 132 pivoted at 133 and connected to an arm 134 on the damper spindle by links 134ᵇ. Any suitable type of thermostat may be provided, but I prefer to arrange a series of pivoted and inter-connected metallic bars 135 of aluminum or other metal having a high coefficiency of expansion. The first bar in the series is rigidly fastened to the conduit casing 72 at 136, the intermediate bars are pivoted at 137 and 133 on levers 138 and the last bar in the series is connected to arm 132. When the heat in the converting conduits raises beyond a certain predetermined point, the combined expansion of the series of bars 135 multiplied by the levers 138 and 132 operates to close the damper and reduce the temperature to the desired degree.

For use in service where it is desirable to idle the engine at very slow speed, I provide means for relieving the compression in the combustion cylinder by passing a part of the inducted charge back to the pump chambers and conduits. Referring to Figs. 1, 2, 3 and 4 the passage through the neck 37 of the combustion cylinder head 36 communicates with a passageway 140 connected to the ignition device 141. This device is the subject of separate application and will not be described in detail further than to state that it consists of a plunger 142 connected to the valve piston 49 by a rod 143 and operating in a cylinder 144 and that gas from the combustion cylinder is admitted to the compression chamber 145 below the plunger 142 when the plunger is at the upper end of its stroke. The combustion cylinder piston is then about half way on its compression stroke and a portion of gas is forced through the port 146 into the chamber 145 and chamber 147. See Fig. 2. A cylindrical valve 148 is located in a seat between the pump cylinders 40 and 40ᵃ and has longitudinal slots 149 on its periphery. Ports 150 lead from the compression chambers 147 and ports 151 lead through the ports 75 and 75ᵃ to the pump chambers 51 and 51ᵃ. A stem 152 is provided in the valve 148 and has an operating arm or handle 153. See Fig. 3. The ports 150 and 151 are normally closed by the valve, but when it is desired to idle the engine very slowly the valve is turned up by the handle 153 to bring the peripheral slots 149 in register with the ports 150 and 151 when a portion of the charge being compressed in the combustion cylinder will be transferred back to the pump cylinders and converting conduits through the passages above described until the port 146 is closed by the plunger 142. This transfer reduces the contents in the combustion cylinder to a small lean charge, relieving the compression and enables the engine to run very slowly without misfiring. The relief valve 148 may also be used in starting the engine, especially when the engine is cold. In this condition the engine may be started on heavy fuel by closing the throttle as for idling and opening the relief valve. A few turns of the engine before opening the throttle will generate a combustible gas in the conduits and this is facilitated by first opening the fuel feed slightly more by means of the thumb nut 118. The fuel spray then issuing from the nozzles of the atomizer will be further broken up in the conduits and will be gasified thoroughly by its rapid and alternating speed through the conduits and by-pass valve. The throttles will then be opened, letting the generated gas into the combustion cylinder to start the engine.

Partially gasified liquid fuel cannot at any time reach the combustion cylinder as such fuel, generally consisting of the heavier constituents of fuel, pass by the intake port on the admission stroke and precipitate toward the lower located pressure valve 86 through which they pass in a strong air current, then after passing upward on the suction stroke toward the upper pump chamber, they are again precipitated against the valve on the succeeding compression stroke. This action will continue in rapid succession until the fuel is broken up and molecular separation and fusion with air takes place. The fuel mixture has been compressed in the conduits D or E and the heavy fuel has been precipitated and passed through the governing valve before the admission to the combustion cylinder occurs on the suction strokes therefor, only the thoroughly gasified oxygenated mixture or dry gas can be inducted into the cylinder and as the induction of this dry gas takes place under pressure during the compression stroke of the power piston, no time and condition exists for the condensation of the gas after induction.

The converted gas, on account of its supervolatile condition especially with lighter loads, combines freely and quickly with the air in the combustion cylinder, and as this air is a constant quantity, the final compression is always high and the combustion after ignition is rapid and complete under all loads and condition.

The unequal rarity of the air at high and low altitudes is automatically compensated for with this cycle and the normal power output maintained in all altitudes. The weight of gas inducted per piston stroke remains contant with the same load for all altitudes below twenty-thousand feet. Normally at that height an engine loses about fifty per cent. of its power, but as in this engine there is a normal surplus of fifty per cent. of gases by-passed at low altitudes, this surplus being controlled by the governing valve pressure, will automatically and proportionally pass to the combustion cylinder as higher altitudes are reached. The total displacement of the co-acting valve pistons is equal to 125 per cent. of that of the corresponding power piston, and as the entire volume is inducted for combustion, at twenty-thousand feet altitude, therefore, five-eighths of the volume needed for maximum load is furnished from the gas induction cylinders and the remaining three-eighths from the air induction or replacer cylinder 38. But as this cylinder, at that altitude, still furnishes forty per cent. of the normal weight of air, the maximum weight of the charge is more than maintained. The exhaust heat still being at maximum, can then be utilized to the full extent for heating the conduit chambers and gas passages.

For ordinary land service in high altitudes this feature of the engine is distinctly valuable, but particularly for air service it is an advantage well known to be of supreme importance for safety and speed. Other contributing elements to efficiency and safety, especially for air service may be thus enumerated. As normal heat is developed in high altitudes, freezing can better be prevented; back firing through carbureter frequently a cause of fire, is impossible, as the combustion fire can never get past the valve pistons; valve troubles are eliminated as there are no other valves than the pistons; imperfect carburization causing dilution of lubricating oil, carbon deposits and loss of power is prevented, as no liquid or imperfectly gasified mixture can ever reach the combustion cylinder; carbureter adjustments are eliminated; head resistance is lessened as compared to the V-type multi-cylinder engines, because the close parallel cylinder formation offers less air resistance surface; better inertia balance and lessened vibration is obtained, as all the inertia forces of a double unit engine, resulting from the reciprocating parts are balanced around the center point X as will be seen by reference to Fig. 20, where a diagrammatical view of a double unit engine is shown to illustrate the nearly perfect inertial balance of all the reciprocating pistons.

In order to counteract the unequal pressure and wear of the power piston on the cylinder walls, due to the angularity of the connecting rod on the power stroke the crank shaft is offset from the center of the cylinder toward the side where the greatest wear occurs.

This offset also lengthens the exhaust period on the compression stroke but does not prevent the unequal wear near the top of the piston and cylinder where the expansion pressure is the greatest. To balance this upper side pressure, the top of the piston is slanted or stepped, so that the side of the greatest pressure is shorter than the opposite side. This piston construction results in a counteracting pressure of the gases on the piston toward the longest side on the power stroke and equalizes the angular pressures at the upper end of the piston for both the compression and expansion stroke, resulting in a longer service life of both the piston and cylinder.

As heretofore shown and described, the engine is particularly adapted to air service, partly on account of its light construction, the casings and pump cylinders being made of aluminum, but especially because of its large range of altitude compensation. For land service and where light weight is not of so great importance and the altitude variation is much less, I prefer to cast the cylinders in blocks of iron or semi-steel and utilize the lower pumping chambers for air in connection with the air pump as shown in Fig. 21. This engine construction is similar to that shown in my application No. 85,572, and in the present invention eliminates the cross gas conduits from the lower pumping chambers to the opposite upper pumping chambers as only the upper chambers are used for generating and inducting gas. The lower air chambers 154 and 154$^a$ of the cylinders 40 and 40$^a$ are connected to the opposite air pump chambers 156 and 156$^a$ by cross conduits 157 and 158 so that air passes from two pumping chambers into the same cylinder. By this arrangement the size of the air pumps may be considerably reduced, the general construction of the engine is simplified and production cheapened. The gas generating casing 159 consists of only two generating conduits 155 and 160 surrounded by heating chambers 161 and 162. The conduit passages 163 and 163$^a$ communicate with the upper chambers through ports 164 and 164$^a$ and with each other through the pressure governing valve 165, which is similar in all respects to the governing valve 86, as heretofore described. Gas induction ports 166 controlled by throttle valves 167 are arranged above the governing valve 165 and a fuel atomizer and feeder 168 is arranged between the conduits 163 and 163ᵃ. The functioning of the parts are substantially the same as heretofore described and are therefore here only alluded to.

In Fig. 22 the gas generating conduit 169 is shown adapted for engines of one or more single combustion cylinder units. The upper and lower pump chambers 170 and 170ᵃ of the cylinder 171 are connected through a conduit 172 and pressure governing valve 173. A port 174, some distance above the valve 173 leads inward from the gas passage 172 in a position to register with the induction port 175 in the valve piston 176 and the fuel feeder 177 is arranged above the valve 173 to spray the fuel in the conduit 172. It is evident that in all cases, the engine might be controlled by adjustment of the spring tension on the governing valve in the gas passages and in Fig. 22 is shown such adjustments. The throttle valve is dispensed with and means are shown to readily adjust the tension of the valve spring. The valve 173 is seated vertically at the annular seat 178 and cross seat 179, with the valve stem 180 having bearings at 181 and 182. A housing 183 having a series of holes through which pass pins 184 is attached to the housing 183. A coil spring 185 is tensioned against the valve 173 to hold it on its seat by means of the pins 184 and a disk 186. An arm 187 on a spindle 188 bears against the disk and a lever 189 fastened to the spindle outside the housing affords means to rock the spindle and adjust the tension of the spring 185. A suitable quadrant 190 is provided on the housing by which the lever may be locked in any desired position and a link 191 connects the lever with the fuel feed adjusting arm 192. Air entering the pump chamber 170ᵃ through a port 193 at the upper end of the piston stroke is, on the downstroke forced through the port 194, valve 173 and conduits 172, past the fuel atomizer and feeder 177 and into the upper pump chamber 170. On the upstroke of the piston the vapor is forced back through the passage 172, the heavier fuel precipitating to and through the valve 173, the lighter gas being compressed in the conduit 172 and entering the combustion cylinder through the port 175. The relative portion of gases passing to the combustion cylinder and through the governing valve to the lower cylinder is dependent on the tension of the valve spring and may be adjusted by the lever 189 according to the load and speed of the engine. The gas conduit 172 is surrounded by an exhaust heated chamber 195, and the gas converting action is precisely the same as in the two cylinder units above described. As the valve spring tension is lessened for slower speed or lighter load, the gas converting action is automatically intensified as required to compensate for the decreasing heat in the combustion cylinder. The volumetric efficiency of the engine in all cases and under all conditions is never appreciably impaired as the combustion cylinder is always completely filled with fresh air and the converted gas, being at all altitudes only a variable minimum portion of the total charge, is in addition inducted under pressure into the combustion cylinder.

I claim as my invention:

1. A gas converter and inductor for internal combustion engines, comprising two compression chambers and a piston working in said chambers, means for supplying air and fuel to said chambers, a connecting conduit between said chambers, a valve automatically controlling the pressure in said chambers and conduit, a passageway in said piston, periodically connecting said conduit to the combustion cylinder of the engine, and a port to said passageway controlled by said piston.

2. A gas converter and inductor for internal combustion engines comprising two compression chambers and a piston in said chambers, a connecting conduit between said chambers, means for supplying gas and fuel to said conduit and chambers, and passing it to and from said chambers through said conduit, a valve in said conduit controlling the pressure in said chambers and conduit, a passageway in said piston periodically connecting said conduit to a combustion cylinder and an exit port to said passageway from said conduit controlled by the piston, said port being spaced away from said valve so that the heavier fuel particles will be precipitated past said exit toward said valve.

3. A gas converter and inductor for internal combustion engines, comprising two compression chambers and a piston working in said chambers, means for supplying air and fuel to said chamber, a conduit between said chambers for passing air and fuel from one chamber to the other, a pressure governing valve normally closing the conduit but automatically opening it when a predetermined pressure is established in the conduit, an exit port from the conduit to a passageway in said piston controlled by the piston and means coöperating with said piston to induct a controlled portion of gas from one compression chamber through said passageway into a combustion cylinder and another portion of gas to the other compression chamber at every alternate stroke of the piston.

4. A gas converter and inductor for internal combustion engines, comprising two compression chambers and a piston in said chambers, ports controlled by said piston for supplying air to said chambers, a connecting conduit between said chambers, a pressure governing valve automatically controlling the passage through said conduit, a fuel atomizer and means for spraying fuel from said atomizer under pressure into said conduit, an exit port from said conduit controlled by said piston, means controlled by said piston for inducting gas from said conduit and chambers through said exit port into a combustion cylinder and means for simultaneously governing the quantity of gas so inducted and of fuel sprayed from the atomizer.

5. A gas converter and inductor for internal combustion engines, comprising two compression chambers and a piston working in said chambers, means for supplying air and fuel vapor to said chambers, a connecting conduit between said chambers, a jacket space surrounding said conduit, means for passing heated gases through said space to heat said conduit, means, including a thermostat to control the heated gases passing through said jacket space, a pressure governing valve, controlling the flow of air and fuel through said conduit, an exit port from said conduit controlled by said piston and means controlled by said piston for inducting gas from said chambers and conduit into a combustion cylinder.

6. A gas generator and inductor for internal combustion engines, comprising two compression chambers and a piston working therein, means for supplying air and fuel vapor to said chambers, a connecting conduit between said chambers for the circulation of air and fuel vapor from one to the other chamber, means for supplying heat to said conduit and controlling the degree of heat within the conduit, a pressure governing valve controlling the circulation of gas between said compression chambers through said conduit, an exit port from said conduit controlled by said piston, a passageway in said piston and means co-acting with said piston to induct gas from said conduit into a combustion cylinder through said passageway.

7. A gas converter and inductor for internal combustion engines, comprising two compression chambers and a piston working in said chambers, a conduit connecting said chambers, a pressure governing valve normally closing said conduit and automatically opening it when a predetermined pressure is established in the conduit by said piston, an exit port controlled by the piston from the conduit to a combustion cylinder, means for supplying a vapor of air and liquid fuel to the chambers and conduit, and passing a controlled portion of said vapor from one chamber through said exit port to said combustion cylinder and conducting another portion past said governing valve to the other chamber at every alternate stroke of said piston.

8. A gas converter and inductor for internal combustion engines, comprising two compression chambers and a piston in said chambers, a conduit connecting said chambers, a pressure controlling valve normally closing said conduit but automatically opening it when a predetermined pressure is established in the conduit, an exit port and passage from the conduit to the combustion cylinder controlled by said piston, an atomizer for spraying atomized fuel under pressure into said conduit to form a vapor, said atomizer consisting of a series of slots and abutments against which the fuel is impinged, means for supplying a limited amount of air to said slots, means for passing a controlled quantity of the resulting vapor forth and back through said conduit past said exit port and valve, for gasifying the vapor, and means controlled by the piston for inducting a portion of the resulting gas into the combustion cylinder.

9. In an internal combustion engine the combination with a power cylinder and a piston working therein, of a compression cylinder and a valve piston working therein, forming two compression chambers, ports for admitting air to said compression chambers, a conduit connecting said chambers, an atomizer for spraying fuel into said conduit, a pressure controlling valve normally closing the conduit but automatically opening it when a predetermined pressure is present in the conduit, an exit port from said conduit controlled by the valve piston to deliver gas from said conduit to the power cylinder, means for varying the flow of gas from said conduit to the power cylinder and means to control the amount of fuel sprayed from the atomizer into said conduit.

10. In an internal combustion engine, the combination with a power cylinder and a piston working therein, of a compression cylinder and a valve piston working therein, means for supplying a fuel mixture to said compression cylinder, an inlet port through which said mixture is inducted into said power cylinder by said valve piston, an exit port from said power cylinder independent of said inlet port through which combustible may be reconducted to said compression cylinder and a valve controlling said independent exit port.

11. An internal combustion engine automatically compensating for variation in altitude, comprising a power cylinder and piston working therein, an air pump cylinder and piston working therein to replace the burnt gases in the power cylinder with air, two compression chambers having a piston working therein at alternating compression strokes, means for supplying air and fuel vapor to said chambers and form a gas thereof, mechanism coöperating with and included in said chambers and said piston for compressing, at every piston stroke, an excess quantity of gas at low altitudes, said excess varying directly as the atmospheric pressure, and inducting a portion of said gas into the combustion cylinder for every power stroke, a conduit connecting said chambers through which the excess gas is circulated, a pressure governing valve normally closing the conduit and automatically opening said conduit when a predetermined pressure is established in the conduit and means regulating the degree of pressure.

12. An internal combustion engine automatically compensating for variation in altitude, comprising a power cylinder and piston working therein, an air pump cylinder and piston working therein to replace the burnt gases in the power cylinder with air, two compression chambers having a piston working therein at alternating compression strokes, means for supplying air and fuel vapor to said chambers and form a gas thereof, mechanism coöperating with and included in said chambers and piston, for compressing, at every piston stroke, an excess quantity of gas at low altitudes, said excess varying directly as the atmospheric pressures, and inducting a portion thereof into the power cylinder, a conduit through which the excess gas is circulated and a pressure governing valve controlling the circulating volume in said conduit to be directly proportional to the atmospheric pressure.

13. An internal combustion engine automatically compensating for variation in altitude comprising a power cylinder and piston working therein, an air pump cylinder and piston working therein to replace the burnt gases in the power cylinder with air, two compression chambers having a piston working therein at alternating compression strokes, means for supplying air and fuel vapor to said chambers and form a gas thereof, mechanism coöperating with and included in said chambers and piston, for compressing, at every piston stroke, an excess quantity of gas at low altitudes, said excess varying directly as the atmospheric pressures, and inducting a portion thereof into the power cylinder, a conduit through which the excess gas is circulated, a pressure governing valve controlling the circulating volume in said conduit, to be directly proportional to the atmospheric pressure, and means coöperating with the governing valve, for controlling the relative quantity of gas inducted into the power cylinder and circulated through the conduit.

14. In an internal combustion engine the combination with a power cylinder and an air pump cylinder and a piston working in each of said cylinders, of two gas pumping chambers and a valve piston working therein, a gas conduit connecting said chambers, means for admitting air to said chambers and said conduit, means for spraying fuel into said conduit to form a gas, passageways controlled by the valve piston for admitting air from the air pump cylinder and gas from said chambers and conduit into the power cylinder, a valve in said conduit and means connected to said valve for controlling the flow of gas in said conduit between said chambers.

15. A gas converter and inductor for internal combustion engines comprising two compression chambers, a valve piston in said chambers having an induction stroke and a by pass stroke, a connecting conduit or by pass between said chambers, means for supplying a fuel vapor to said conduit and chambers, a combustion cylinder, a port for the passage of gas from said conduit to said combustion cylinder, a valve in said conduit spaced from said port so that the heavier fuel vapor, during the induction stroke of the valve piston will be precipitated past said port toward said valve.

16. A gas converter for internal combustion engines comprising a cylinder, a double acting piston working in said cylinder forming two compression or pumping chambers, means for supplying air and gas to said chambers, a passageway between said chambers through which gases are impelled forth and back between said chambers, a spraying valve for admitting liquid fuel to said passage-way, a gas exit from said passage-way and a valve in said passage-way controlling the flow and the exit of gas from said passage-way, said valve being spaced from said exit in the direction of the flow of said gas.

17. A gas converter for internal combustion engines comprising a cylinder, a double acting piston working in said cylinder, forming two compression chambers, means for supplying air and gas to said chambers, a passage-way between said chambers through which gases are impelled forth and back by said piston, a jacket surrounding said passage-way, means for heating said jacket, a spraying valve for admitting liquid fuel to said passage-way, a gas exit from said passage-way and a valve controlling the flow and the exit of gas from said passage-way.

18. A gas converter and inductor for internal combustion engines comprising a cylinder and a piston working in said cylinder, a plurality of piston chambers and means for admitting air to said chambers, a passage-way or conduit between said chambers through which air is caused to circulate in alternate directions to and from said chambers, means for spraying liquid fuel into the circulating medium, an exit port from said conduit controlled by said piston and a governing valve for creating and controlling pressure in said conduit, said valve being spaced from said exit in the direction in which the said medium passes to one of said chambers.

19. A gas converter and inductor for internal combustion engines, comprising a cylinder and a piston working in said cylinder, a plurality of piston chambers and means for admitting air to said chambers, a conduit through which a power medium is caused to circulate in alternate directions to and from said chambers, means for spraying liquid fuel into the circulating medium, means for supplying heat to said conduit from outside sources, a valve in said conduit controlling the pressure and circulation of said medium, an exit from said conduit, and a port controlled by a valve for periodically admitting power medium from said conduit to a combustion cylinder through said exit.

20. An internal combustion engine automatically maintaining charge pressures independent of varying atmospheric pressure, comprising a power cylinder, means for circulating an excess of power medium external to said cylinder when operating in low altitudes, a piston circulating said medium and charging said power cylinder from said medium at a pressure higher than atmosphere and means for automatically regulating the quantity of medium charged relative to the quantity of circulating medium to vary inversely with altitude and atmospheric pressure.

21. The method of charging internal combustion engines with power medium and automatically equalizing the charge compression in the combustion cylinder at varying altitudes and atmospheric pressure, which consists in constantly drawing from atmosphere and circulating in a conduit external to the combustion cylinder, an excess of charge medium, admitting said medium in one zone of the conduit at or near atmospheric pressure and charging the combustion cylinder from another zone of the conduit at a higher pressure produced by a pressure-yielding element in said conduit whereby the excess of charge medium will be released for continued circulation in the conduit and a constant pressure maintained in the charging zone and the quantity of charge released for circulation will automatically vary in an inverse ratio to atmospheric pressure.

22. A gas converter for internal combustion engines comprising two compression chambers, a conduit connecting said chambers, means for circulating a mixture of fuel and air through said conduit between said chambers, a valve-controlled exit for said mixture from said conduit and chambers and a pressure yielding valve arranged in said conduit controlling the relative quantity of the mixture flowing between said chambers and passing through said exit.

23. An internal combustion engine automatically maintaining a normal compression in the combustion chamber, comprising a power cylinder, a charging cylinder having two chambers, a conduit between said chambers, a double acting piston working in said chambers passing an excess of charging medium through said conduit to and from said chambers, a yielding pressure valve through which the excess of charging medium is released and means coöperating with said double acting piston for charging the power cylinder from the charging medium.

24. An internal combustion engine automatically controlling charge pressures independent of atmospheric pressure comprising a power cylinder, means including a piston for charging the power cylinder with power medium against a pressure yielding valve member and means controlled by said member for by-passing the excess of power medium in a proportion inversely to atmospheric pressure.

25. A fuel mixture inductor for internal combustion engines, comprising a cylinder, a double acting piston working in said cylinder forming two chambers, means for supplying a fuel mixture to said chambers, a passageway connecting said chambers, a yielding pressure valve in said passageway for producing a pressure chamber in said passageway and cylinder and a valve controlled exit and passage from said pressure chamber for conducting mixture to a combustion chamber.

26. In an internal combustion engine, the combination with a power cylinder, of an induction cylinder, a double acting piston working in said cylinder, forming two chambers, a passageway connecting said chambers, means for supplying a fuel mixture to said chambers and passageway, a pressure yielding by-pass valve in said passageway, producing a pressure chamber in said passageway and cylinder, means for controlling the pressure in said pressure chamber and a valve controlled exit and passage from said pressure area for conducting the fuel mixture to the combustion cylinder.

27. A gas converter for internal combustion engines comprising two compression chambers, a conduit connecting said chambers, means for spraying liquid fuel into said conduit, means for circulating air mixed with said fuel through said conduit between said chambers, an exit for said mixture under pressure from said conduit and chambers, and an automatic pressure yielding valve interposed in said conduit governing the relative flow of the mixture in said conduit between said chambers and its exit under pressure therefrom.

28. A gas converter for internal combustion engines comprising two compression chambers, a passageway connecting said chambers, means for circulating a mixture of fuel and air through said conduit, an exit for said mixture from said passageway and chambers, a valve closing said passageway with yielding pressure, and means controlling the flow of mixture in said passageway and its exit therefrom and means for regulating said yielding pressure on said valve.

In witness whereof, I have hereunto set my hand this 12th day of August 1919.

JAMES JESSEN.